(12) United States Patent
Allebach et al.

(10) Patent No.: US 11,481,995 B2
(45) Date of Patent: Oct. 25, 2022

(54) DETECTING STREAKS IN PRINTED DOCUMENTS USING BLOCKS

(71) Applicants: Hewlett-Packard Development Company, L.P., Spring, TX (US); Purdue Research Foundation, West Lafayette, IN (US)

(72) Inventors: Jan Allebach, Boise, ID (US); Richard E. Maggard, Boise, ID (US); Renee J. Jessome, Boise, ID (US); Mark Q. Shaw, Boise, ID (US); Runzhe Zhang, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/257,871

(22) PCT Filed: Jan. 11, 2019

(86) PCT No.: PCT/US2019/013233
§ 371 (c)(1),
(2) Date: Jan. 5, 2021

(87) PCT Pub. No.: WO2020/145986
PCT Pub. Date: Jul. 16, 2020

(65) Prior Publication Data
US 2021/0326621 A1    Oct. 21, 2021

(51) Int. Cl.
*G06V 10/98* (2022.01)
*G03G 15/00* (2006.01)
*G06T 7/00* (2017.01)
*H04N 1/409* (2006.01)
*G06V 10/56* (2022.01)

(52) U.S. Cl.
CPC ......... *G06V 10/98* (2022.01); *G03G 15/5062* (2013.01); *G06T 7/0004* (2013.01); *G06V 10/56* (2022.01); *H04N 1/4097* (2013.01); *G06T 2207/30144* (2013.01)

(58) Field of Classification Search
CPC .... G03G 15/5062; G06V 10/98; G06V 10/56; G06T 7/0004; G06T 2207/30144; H04N 1/4097
See application file for complete search history.

(56) References Cited

U.S. PATENT DOCUMENTS

| | | |
|---|---|---|
| 8,570,601 B2 | 10/2013 | Skinner et al. |
| 8,654,369 B2 | 2/2014 | Kogan et al. |
| 8,749,843 B2 | 6/2014 | Liu et al. |

(Continued)

FOREIGN PATENT DOCUMENTS

WO    WO-2015147151 A1    10/2015

*Primary Examiner* — Carla J Therrien
(74) *Attorney, Agent, or Firm* — Brooks Cameron & Huebsch PLLC (57) ABSTRACT

In an example method, an image of a printed document is descreened. The descreened image is separated into blocks. A smooth area of the descreened image is selected based on an averaging of localized color distance values of pixels in each of the blocks. A streak in a block of the smooth area is detected in response to detecting that a magnitude of a color distance projection of the block exceeds a threshold value.

20 Claims, 8 Drawing Sheets

(56) References Cited

U.S. PATENT DOCUMENTS

| | | |
|---|---|---|
| 8,761,454 B2 | 6/2014 | Berkovich et al. |
| 9,944,104 B2 | 4/2018 | Ukishima |
| 9,946,944 B2 | 4/2018 | Yamazaki |
| 2008/0068660 A1* | 3/2008 | Loce ................. H04N 1/40075 358/1.9 |
| 2012/0033238 A1 | 2/2012 | Liu |
| 2015/0110505 A1* | 4/2015 | Takahashi .............. G03G 15/55 399/15 |
| 2017/0013165 A1* | 1/2017 | Katsuyama ............ B41J 2/2139 |
| 2017/0144464 A1 | 5/2017 | Yamazaki |
| 2017/0274690 A1 | 9/2017 | Ukishima |
| 2018/0082115 A1 | 3/2018 | Itan |
| 2018/0086049 A1 | 3/2018 | Ueshima |
| 2018/0089820 A1 | 3/2018 | Itan et al. |
| 2019/0057499 A1* | 2/2019 | Dekel-Klein ....... B41F 33/0036 |
| 2021/0304385 A1* | 9/2021 | Nakada ............... B41F 33/0036 |

* cited by examiner

DETECTING STREAKS IN PRINTED DOCUMENTS USING BLOCKS

BACKGROUND

Electrophotographic printers are used to print documents onto print media. For example, electrophotographic printers can use electrostatically charged toner particles to print images onto the print media.

BRIEF DESCRIPTION OF THE DRAWINGS

Various features of the techniques of the present application will become apparent from the following description of examples, given by way of example only, which is made with reference to the accompanying drawings, of which.

DETAILED DESCRIPTION

Electrophotographic printers are used to print documents onto print media. For example, a drum of the electrophotographic printer may be uniformly charged across its surface. An image of the document is then projected onto and synchronized with the moving drum surface. For example, in a laser or a light emitting diode (LED) printer, modulated light is projected onto the drum surface to create the latent image. The modulated light is used to create the positive image on the drum. The drum is then presented with toner that is electrostatically charged and attracted to the image. The print media is then passed between the drum and a transfer corona or a transfer roller with a polarity opposite of the charge of the toner. The toner image is then transferred from the drum to the paper by a combination of pressure and electrostatic attraction and permanently fixed to the print medium using either heat and pressure or a radiant fusing technology to melt and bond the toner into the medium. In some examples, the drum is discharged by light after fixing or fusing of the toner. Remaining toner on the drum can then be removed from the drum surface by a rotating brush under suction, or a squeegee known as a cleaning blade.

However, various issues may arise during this printing process resulting in defects such as streaks that can dramatically affect print quality. For example, streaks may be caused by a faulty organic photo conductor (CPC). In some examples, streaks may be caused by a faulty intermediate transfer belt (ITB). In further examples, the streaks may be caused by a faulty developer.

Described herein are techniques for detecting streaks using blocks. As used herein, a block refers to a portion of a printed image. For example, an image printed and scanned may be separated into a number of blocks. In some examples, the image may be descreened before being separated into blocks. In some examples, a smooth area of the descreened image is selected based on an averaging of localized color distance values of pixels in each of the blocks. A streak in a block of the smooth area is detected in response to detecting that a magnitude of a color distance projection of the block exceeds a threshold value. In particular, the techniques described herein can be used to test for vertical streaks caused by various root causes. In some examples, the techniques can also be used to identify a type of streak and a root cause of the streak. In various examples, the detected root cause can be automatically repaired. Using logistic regression to remove false detections as described herein, the accuracy of the resulting streak detections was experimentally found to be 99.35%.

Figure 1:
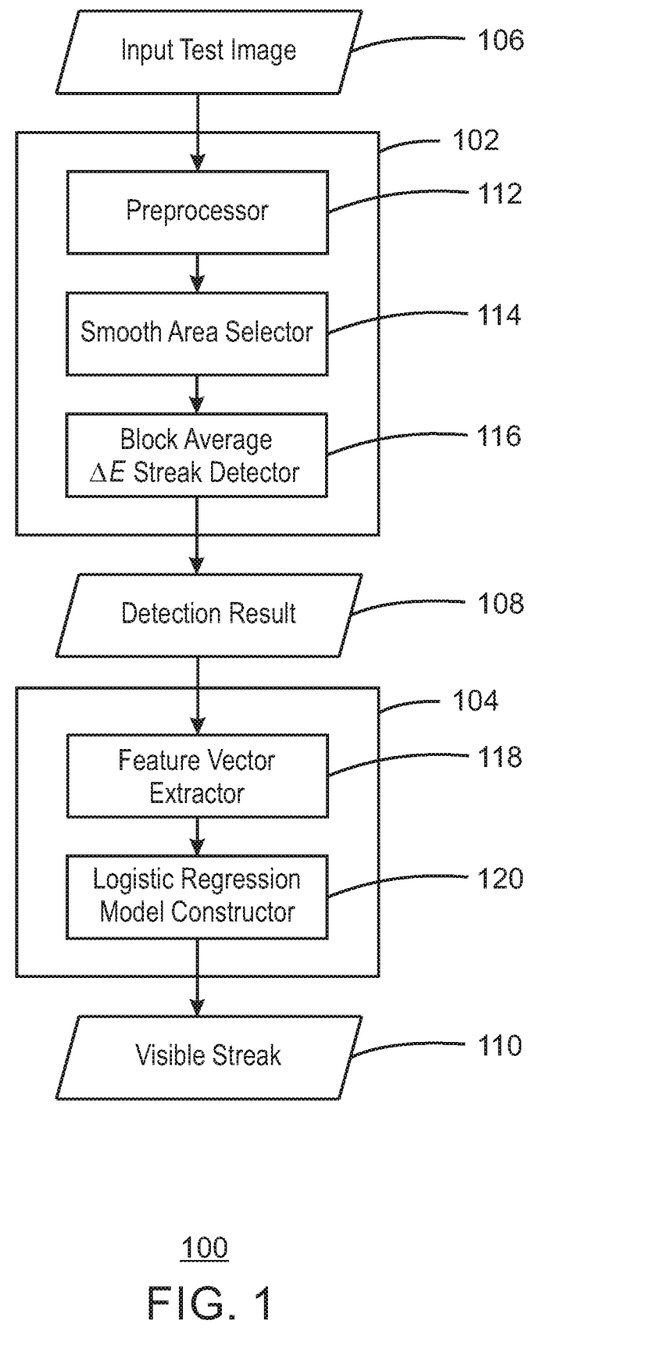
FIG. 1 is a block diagram of an example system for detecting streaks using blocks and classifying streaks using extracted features.

FIG. 1 is a block diagram of an example system for detecting streaks using blocks and classifying streaks using extracted features. The system 100 can be implemented using the methods 300 and 400 of FIGS. 3 and 4, the computing device 502 of FIGS. 5A and 5B, or the machine-readable storage medium 600 of FIGS. 6A and 6B.

The system 100 includes a streak detector 102 communicatively coupled to a streak classifier 104. The system 100 includes an input test image 106. For example, the input test image 106 may be an image of a printed document. In some examples, the document may have been scanned using a scanner, such as an inline scanner of a printer. In some examples, the document may be scanned using a scanner of a multi-function printer (MFP). The streak detector 102 includes a preprocessor 112. The streak detector 102 also includes a smooth area selector 114 communicatively coupled to the preprocessor 112. The streak detector 102 further includes a block average delta E ($\Delta E$) streak detector 116 communicatively coupled to the smooth area selector 114. The streak classifier 104 includes a feature vector extractor 118 communicatively coupled to a logistic regression model constructor 120.

In the example system 100, an input test image 106 is received from a scanner. For example, the input test image 106 may be received in real-time as a printer is printing out a document. In some examples, a streak defects detection algorithm (not shown) may monitor print quality as the printer prints out documents. In some examples, in response to detecting that print quality does not exceed a predetermined threshold, the streak detector 102 receives the input test image 106 for detecting streaks that may be causing the low print quality. The detection result 108 from the streak detector 102 may then be classified using the streak classifier 104 to classify the detected streak as a non-visible streak or a visible streak 110. In some examples, the streak classifier 104 also detects a type of the visible streak 110 and a root cause of the visible streak 110. In various examples, this information can be transmitted to a remote computer for further analysis.

The streak detector 102 can detect streaks in the input test image 106 using blocks. In particular, the preprocessor 112 receives the input test image 106. In some examples, the input test image 106 is in a sRGB color space and is gamma corrected. In various examples, the preprocessor can perform gamma un-correction and covert the color space from sRGB to CIE L*a*b*. The preprocessor 112 also descreens the input test image 106 to remove halftone patterns. For example, the preprocessor 112 can use a Gaussian filter or any other suitable filter or algorithm as part of a descreening algorithm to remove the halftone patterns. As used herein, a Gaussian filter is a filter whose impulse response is a Gaussian function or an approximation to the Gaussian function. In some examples, the Gaussian filter size is 15×15 pixels and the standard deviation σ=2 pixels. As one example, the preprocessor 112 can descreen the input test image 106 using the equation:

$$f'(x,y,c) = \sum_{i=-7}^{7} \sum_{j=-7}^{7} f(x+i, y+j, c) g(i,j) \quad \text{Eq. 1}$$

where f(x,y,c) is the input image in the CIE L*a.b* color space, g(i,j) is the 15×15 Gaussian filter, and f'(x,y,c) is the descreened result. The preprocessor 112 can then separate the descreened image into a number of blocks of predetermined size. For example, the blocks may have a predetermined size of 200×200 pixels.

The smooth area selector 114 receives descreened blocks of the input test image 106 and selects a smooth area on which to perform streak detection. For example, the smooth area can be selected such that streak defects are included in the smooth area but content of the printed document are excluded from the smooth area. For example, the content may be custom content including vertical lines that could be mistaken for streaks.

In various examples, the smooth area selector 114 selects the smooth area of the input test image 106 using an average delta E ($\Delta$E) value of each block. $\Delta$E is a metric for measuring color difference as perceived by the human eye. For example, the smooth area selector 114 can calculate $\Delta$E of each pixel in one of the blocks using the equations:

$$\Delta E(i,j) = \sqrt{(L_{(i,j)} - L_{ave})^2 + (a_{(i,j)} - a_{ave})^2 + (b_{(i,j)} - b_{ave})^2} \quad \text{Eq. 2}$$

$$L_{ave} = \frac{\sum_{i=1}^{M} \sum_{j=1}^{M} L_{(i,j)}}{M^2} \quad \text{Eq. 3}$$

$$a_{ave} = \frac{\sum_{i=1}^{M} \sum_{j=1}^{M} a_{(i,j)}}{M^2} \quad \text{Eq. 4}$$

$$b_{ave} = \frac{\sum_{i=1}^{M} \sum_{j=1}^{M} b_{(i,j)}}{M^2} \quad \text{Eq. 5}$$

where the subscript (i, j) is the pixel position in the image, the subscript ave is the average value of each channel value in one block, and M is the block size. The smooth area selector 114 then uses the $\Delta$E values of the pixels in each block to calculate an average $\Delta$E value for each block. For example, the smooth area selector 114 can calculate an average $\Delta$E value for each block using the equation:

$$\Delta E_{block} = \frac{\sum_{i=1}^{M} \sum_{j=1}^{M} \Delta E(i,j)}{M^2} \quad \text{Eq. 6}$$

In addition to calculating the average $\Delta$E values $\Delta E_{block}$ of the test image, the smooth area selector 114 may receive an average $\Delta$E value threshold for average $\Delta$E values $\Delta E_{block}$ used to select the smooth area of the input test image 106. In various examples, the average $\Delta$E value threshold is a manually set parameter. If the average $\Delta$E value threshold is too small, the streak defect will belong to the unsmooth area, otherwise, many small customer contents will belong to the smooth area. As one example, the threshold is 2. In some examples, the average $\Delta$E value threshold can be verified by the streak feature used to calculate the severity of streaks as described with respect to Eq. 8. In various examples, the average $\Delta$E value threshold can be automatically configured based on the streak feature. For example, the average $\Delta$E value threshold can be automatically configured using a classifier, such as a state vector machine (SVM), a neural network, or other classification algorithm.

The block average $\Delta$E streak detector 116 can then detect streaks based on the using $\Delta$E projection. For example, as streaks are vertical lines in input test images 106, with vertical referring to the same direction to the printing process direction, the block average $\Delta$E streak detector 116 can project the $\Delta$E of each column in a block along the printing process direction. The magnitude of $\Delta$E streak projection is higher for detected streaks than areas without streaks. For example, the magnitude of the $\Delta$E streak projection may be almost twice the $\Delta$E streak projection value of the smooth area. Thus, to distinguish the streak from the smooth area, a projection threshold $T_{\Delta E_{proj}}$ may be set according to the equation:

$$T_{\Delta E_{proj}} = \Delta E_{block} \times M \quad \text{Eq. 7}$$

where M is the size of the block. As one example, the block is 200 pixels×200 pixels. In various examples, the block average $\Delta$E streak detector 116 marks projection magnitudes exceeding the projection threshold as detected streak defects. In some examples, once an entire input test image 106 is processed by the streak detector 102, a detection result 108 is output. For example, the detection result 108 includes streak defects detected by the streak detector 102.

The detection result 108 includes all the streaks visible to naked eye, but may also include many noise detections. The noise detections may be a result of using a single threshold projection to detect a number of different types of streaks. For example, the various types of streaks may include a developer streak, an ITB streak, an OPC streak, or a dirty scanner streak. The threshold may thus be set to include various types of streaks as well as some noise detections. The noise detections may be very small defects that may be difficult to detect by the human eye or short vertical lines of less than ⅓ of an inch. These noise detections may thus be labeled as streaks, but may be too small to be seen by human eye. In various examples, the streak classifier 104 can use a logistic regression algorithm to remove the noise detections from the detection results 108 and output visible streaks 110.

The streak classifier 104 includes a feature vector extractor 118 to extract feature vectors from the detection result 108. In various examples, a connected component algorithm can label different streak detection results before the features are extracted by the feature vector extractor 118. The connected component algorithm is an algorithm used to detect individual objects. For example, the connected components algorithm labels the pixels in detected individual objects with internal ID numbers. As one example, the internal ID numbers are numbers that are consecutively generated for each detected component.

The feature vector extractor 118 can then extract various features from the detection result 108. For example, the feature vector extractor 118 can extract an area of the detection result 108. The area may be equal to the number of pixels N included in each detection result 108.

In some examples, the feature vector extractor 118 extracts a length to width ratio of the streak detection result 108. For example, because the streak is a vertical line in the input test image 106, the greater length-width ratio of the detection result, the greater the probability of a streak defect. In various examples, the feature vector extractor 118 accesses the length and width of each streak detection result from the connected component calculation process. For example, the connected components calculation can extract a region of the object that includes a height in pixels, a width in pixels, and an area. In some examples, the connected components calculation performs a more detailed analysis that includes a calculation of the width of the object, angle of the max length, aspect ratio of height to width, average color, and other features that define each detected object.

In various examples, the feature vector extractor 118 extracts a severity of the streak detection result. For example, the feature vector extractor 118 can extract the severity based on the area of the streak detection result and the average ΔE value of the streak detection result 108. As one example, the feature vector extractor 118 can extract the severity feature S using the equation:

$$S = \Delta E_{streak-ave} \times N \quad \text{Eq. 8}$$

where N is the number of pixels included in the streak detection result 108.

In some examples, the feature vector extractor 118 extracts a luminance channel difference. For example, lightness can be used to classify streaks as light streaks versus dark streaks. Because the luminosity (L*) channel represents the lightness value, the feature vector extractor 118 calculates the average value of the luminosity channel in the smooth area. Then, the feature vector extractor 118 calculates the luminosity channel difference of each streak detection result 108. As one example, the feature vector extractor 118 can calculate the luminosity channel difference using the equation:

$$\overline{L}_{streak} = \frac{\sum_{i=1}^{N} L_i - \overline{L}_{smooth}}{N} \quad \text{Eq. 9}$$

where $\overline{L}_{smooth}$ is the average value of the luminosity channel in the smooth area. In some examples, if $\overline{L}_{streak}$ is positive, then the streak detection result 108 is a light streak. In various examples, if $\overline{L}_{streak}$ is negative, then the streak detection result 108 is a dark streak.

Figure 2:
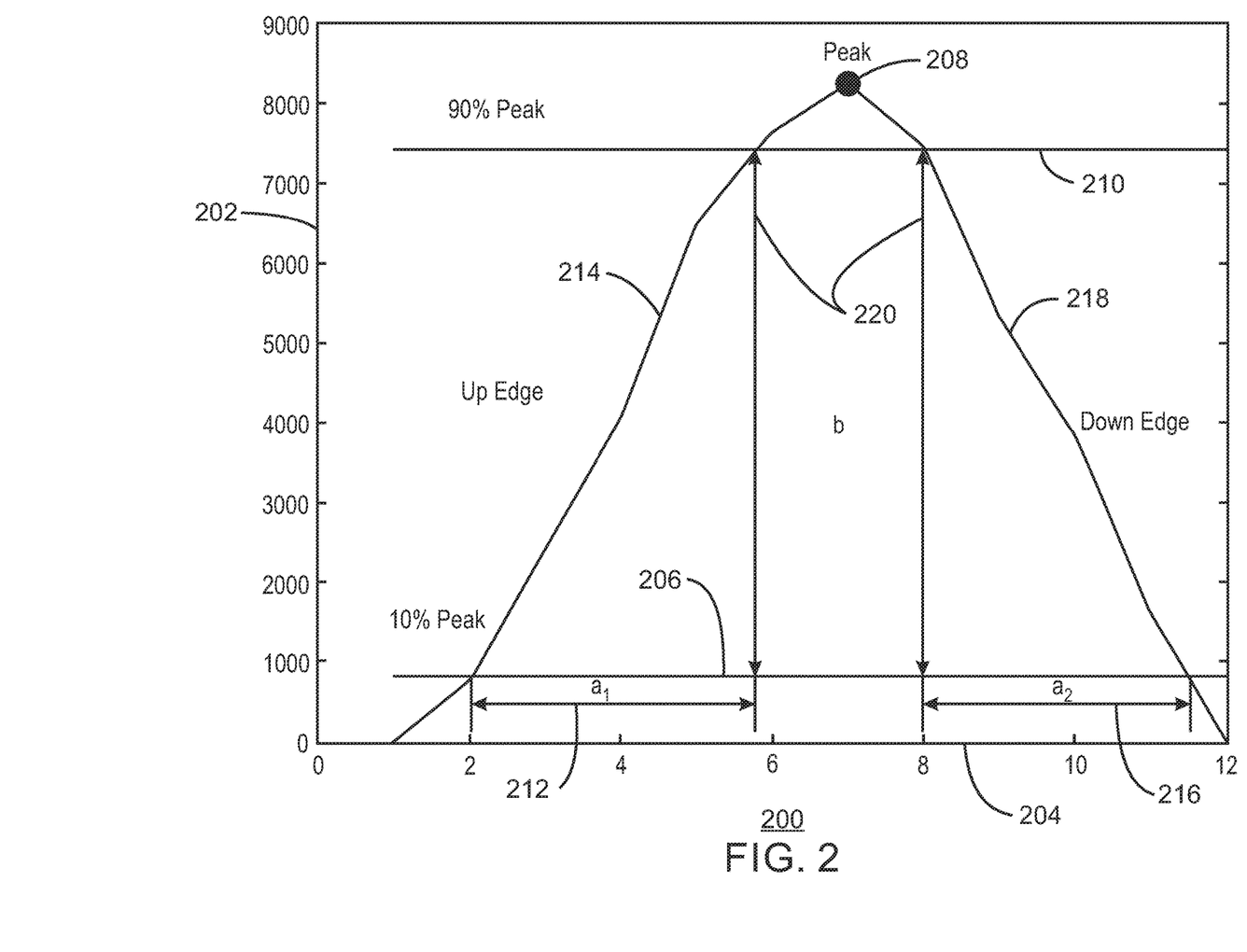
FIG. 2 is a graph depicting an example sharpness feature calculation.

Still referring to FIG. 1, in some examples, the feature vector extractor 118 extracts a sharpness of the streaks. Sharpness is defined by the boundaries between zones of different tones or colors. As one example, the feature vector extractor 118 calculates sharpness using the rise distance of the edge. For example, the rise distance is the distance in pixels, millimeters, or fraction of image height for the pixel level to change from 10% to 90% of its final value. This sharpness calculation method is referred to herein as a 10-90% rise distance. To calculate the 10-90% rise distance, the feature vector extractor 118 first projects the ΔE value of each streak detection result 108. Then, the feature vector extractor 118 can calculate the sharpness of streak $S_{streak}$ using the equation:

$$S_{streak} = \frac{2 \times b}{(a_1 + a_2)} \quad \text{Eq. 10}$$

where $a_1$ is the number of pixels in the width of an up edge and $a_2$ is the number of pixels in the width of a down edge, and b is the value of 80% of the rise distance. An example sharpness feature calculation is described in detail with respect to in FIG. 2.

In various examples, after the feature vector extractor 118 extracts the various features from the detection result 108, the feature vector extractor 118 can normalize each of the extracted features for logistic regression classification. For example, the absolute value can be used to scale the change in luminance before the logistic regression is applied. In various examples, every feature is normalized to a range of values from zero to one, corresponding the lowest value and the highest value of each of each of the features. For example, a value is applied to the aspect ratio to scale the value of the aspect ratio to a defined range.

The block diagram of FIG. 1 is not intended to indicate that the example system 100 is to include all of the components shown in FIG. 1. Further, the system 100 may include any number of additional components not shown in FIG. 1, depending on the details of the specific implementation.

FIG. 2 is a graph depicting an example sharpness feature calculation. The sharpness feature calculation 200 can be performed using the feature vector extractor 118 of FIG. 1, the feature extractor 524 and processor 504 of the computing device 502 of FIG. 5A or the processor 602 of the machine-readable storage medium 600 of FIG. 6A.

The graph of FIG. 2 includes a first axis representing delta E projection values 202 and a second axis representing scan direction pixels 204. A first horizontal line indicates a value of 10% 206 of a peak value 208. A second horizontal line indicates a value of 90% 210 of the peak value 208. A horizontal double ended arrow indicates a width $a_1$ 212 of an up edge 214. A second horizontal double-ended arrow indicates a width $a_2$ 216 of a down edge 218. A pair of vertical lines indicate a b 220.

As shown in FIG. 2, a sharpness feature can be calculated using Eq. 10. In this example, the peak value 208 of the delta E projection value is approximately 8400. The 90% peak value 210 is therefore 7560 and the 10% peak value is 840. The 80% value b 220 is therefore 6720. Moreover, the width $a_1$ 212 of the up edge 214 is approximately 3.8 and the width $a_2$ 216 of the down edge 218 is approximately 3.4. Thus, the sharpness feature may be calculated as $$\frac{2 \times 6720}{(3.8 + 3.4)} = 1866.667.$$

It is to be understood that the graph of FIG. 2 is not intended to indicate that all of the elements of the sharpness feature calculation 200 are to be included in every case. Further, any number of additional elements not shown in FIG. 2 may be included in the sharpness feature calculation 200, depending on the details of the specific implementation. For example, the sharpness feature calculation 200 may include the use of different percentages of peak value, different up edges and down edges, etc.

Figure 3:
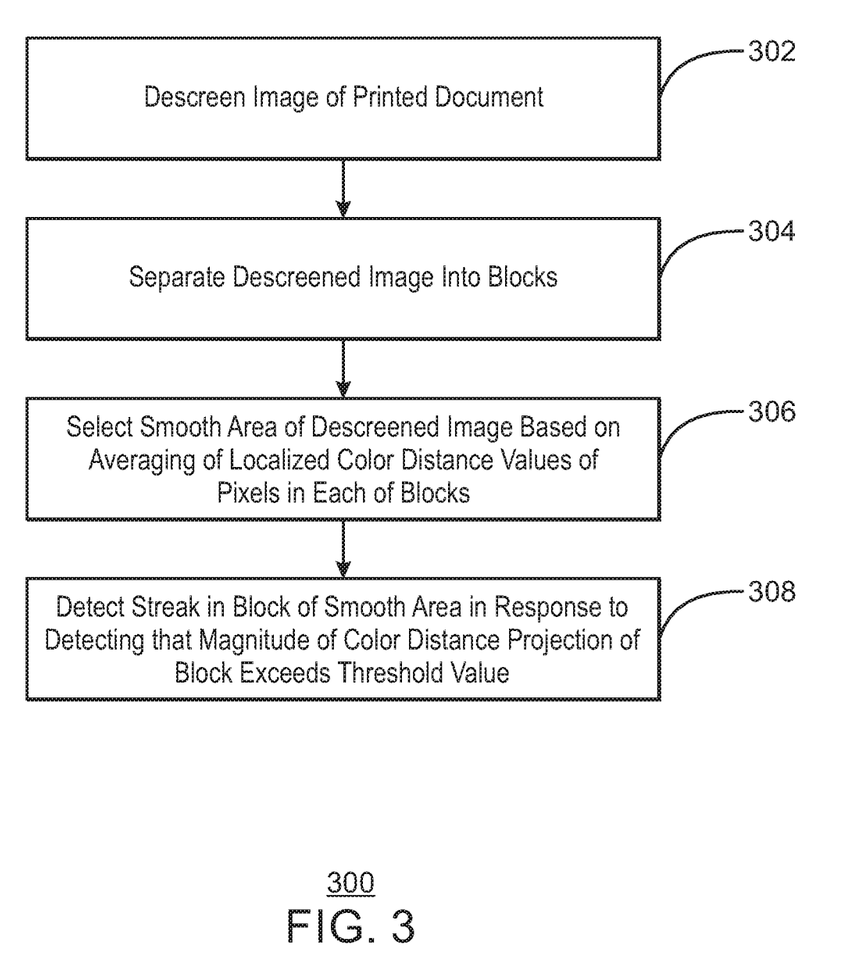
FIG. 3 is a process flow diagram illustrating an example method for detecting streaks using blocks.

FIG. 3 is a process flow diagram illustrating an example method for detecting streaks using blocks. The method 300 of FIG. 3 can be implemented using the streak detector 102 of FIG. 1, the streak detector 522 and processor 504 of the computing device 502 of FIGS. 5A and 5B or the processor 602 of the machine-readable storage medium 600 of FIGS. 6A and 6B.

At block 302, an image of a printed document is descreened. In some examples, halftone patterns are removed from the image using a Gaussian filter. In various examples, the halftone patterns are removed from the image using a median filter or a human visual system (HVS) filter.

At block 304, the descreened image is separated into blocks. In some examples, the descreened image is separated into blocks of a predetermined size.

At block 306, a smooth area of the descreened image is selected based on an averaging of localized color distance values of pixels in each of the blocks.

At block 308, a streak is detected in a block of the smooth area based on a color distance projection of the block. For example, the streak can be detected in response to detecting that a projection threshold is exceeded. In some examples, the projection threshold is preset or automatically configured based on a streak feature.

It is to be understood that the process diagram of FIG. 3 is not intended to indicate that all of the elements of the method 300 are to be included in every case. Further, any number of additional elements not shown in FIG. 3 may be included in the method 300, depending on the details of the specific implementation. For example, the method may include extracting features and classifying the detected streaks as described with respect to FIG. 4.

Figure 4:
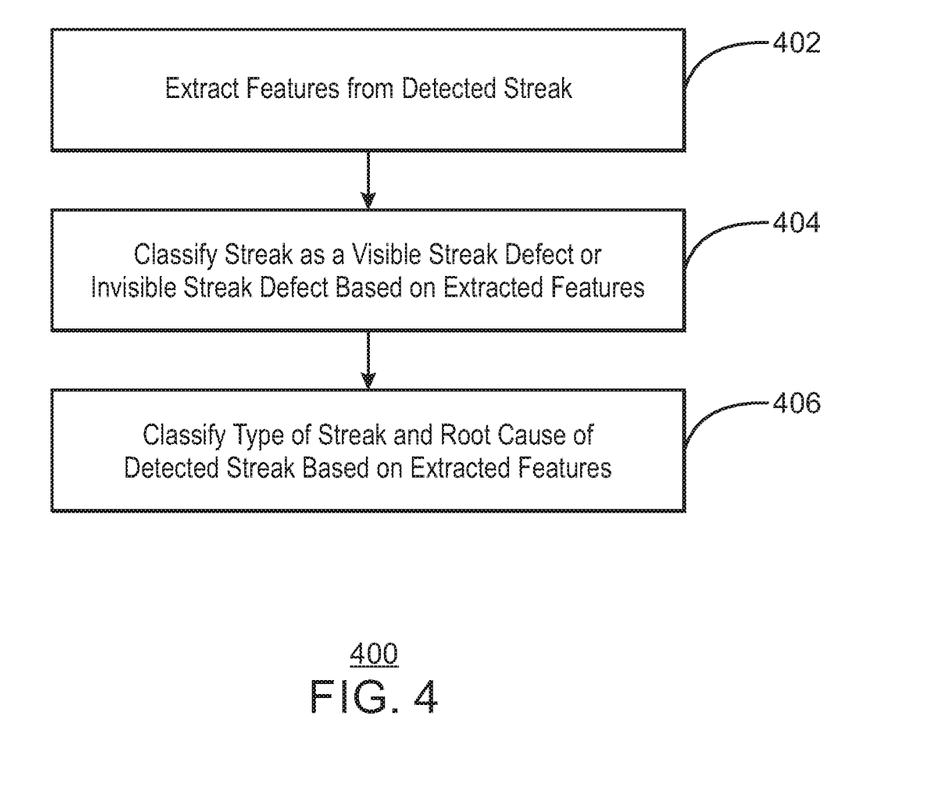
FIG. 4 is a process flow diagram illustrating an example method for classifying streaks using extracted features.

FIG. 4 is a process flow diagram illustrating an example method for classifying streaks using extracted features. The method 400 of FIG. 4 can be implemented using the streak classifier 104 of FIG. 1, the logistic regression classifier 526 and processor 504 of the computing device 502 of FIG. 5A or the processor 602 of the machine-readable storage medium 600 of FIG. 6A.

At block 402, features are extracted from the detected streak. For example, the features can include an area of the detected streak, a length to width ratio of the detected streak, a severity of the detected streak, a luminance channel difference, a sharpness of the detected streak, or any combination thereof. In some examples, the features may be extracted and used to generate a feature vector including a number of features.

At block 404, the streak is classified as a visible streak defect or an invisible streak defect based on the extracted features. In various examples, the detected streak is processed via a trained logistic regression classifier to classify the detected streak as a visible streak defect or an invisible streak defect. For example, the logistic regression classifier may be trained with a logistic loss function using features extracted from training images of various streaks with known causes.

At block 406, a type of streak and a root cause of the detected streak is detected based on the extracted features. For example, the type of streak may be a developer streak, an ITB streak, an OPC streak, or a dirty scanner streak. In various examples, the type of streak and a root cause of the type of defect via the trained logistic regression classifier based on the extracted features.

It is to be understood that the process diagram of FIG. 4 is not intended to indicate that all of the elements of the method 400 are to be included in every case. Further, any number of additional elements not shown in FIG. 4 may be included in the method 400, depending on the details of the specific implementation. For example, the detected root cause can be automatically repaired in response to detecting the type of streak and root cause of the detected streak.

Figure 5A:
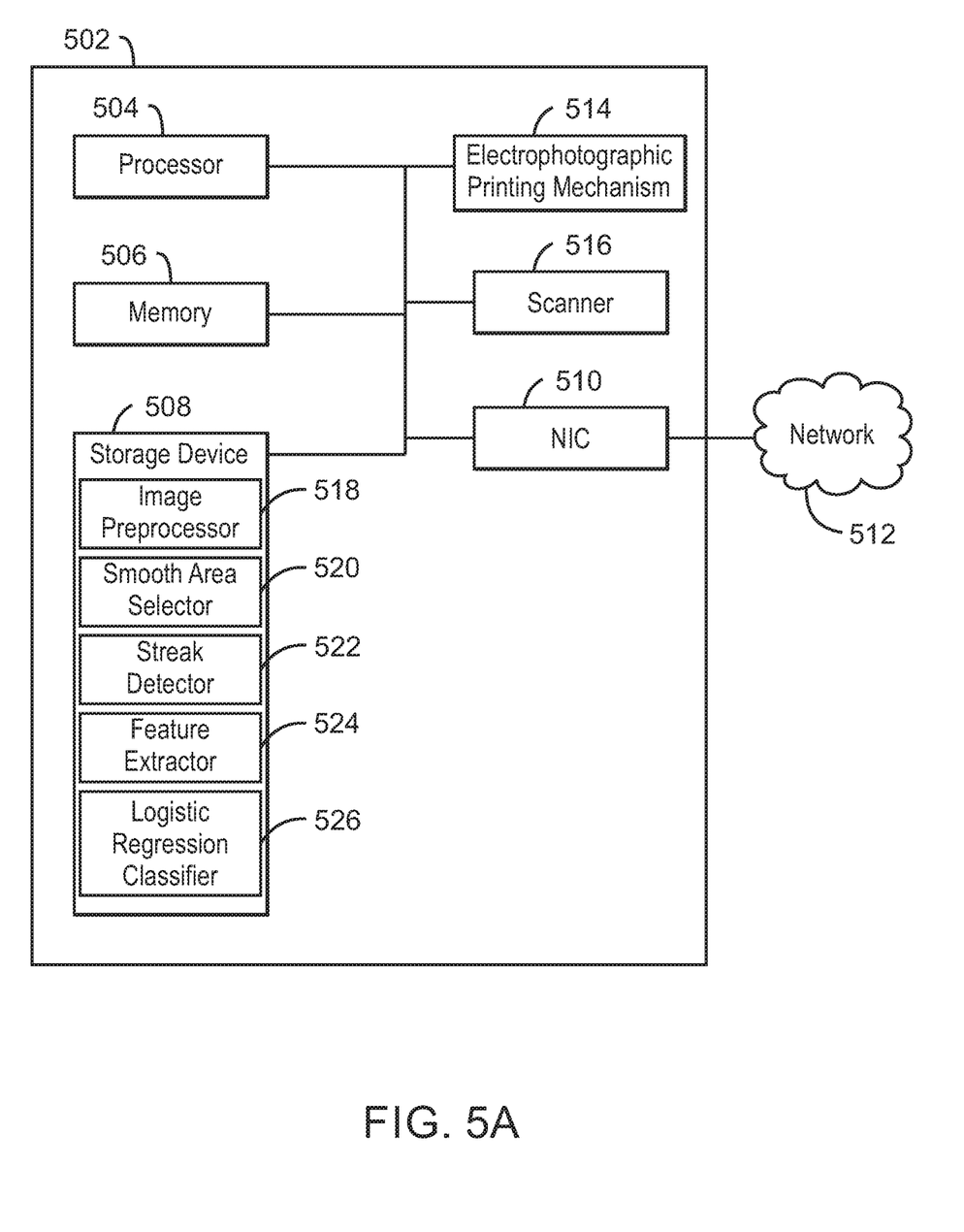
FIG. 5A is block diagram of an example computing device to detect streaks using blocks and classify detected streaks using extracted features.

FIG. 5A is a block diagram of an example computing device 502 to detect streaks using blocks and classify detected streaks using extracted features. The computing device 502 may include a processor 504, memory 506, a machine-readable storage 508, and a network interface 510 to connect computing device 502 to network 512. For example, the network interface 510 can be a network interface card (NIC).

In some examples, the processor 504 may be a main processor that is adapted to execute the stored instructions. Moreover, more than one processor 504 may be employed. Further, the processor 504 may be a single core processor, a multi-core processor, a computing cluster, or any number of other configurations. The processor 504 may be implemented as Complex Instruction Set Computer (CISC) or Reduced Instruction Set Computer (RISC) processors, x86 Instruction set compatible *processors*, ARMv7 Instruction set compatible processors, multi-core, or any other microprocessor or central processing unit (CPU).

The memory 506 may be a memory device. The memory 506 may be volatile memory or nonvolatile memory. In some examples, the memory 506 may include random access memory (RAM), cache, read only memory (ROM), flash memory, and other memory systems.

The storage 508 is machine-readable storage and may include volatile and nonvolatile memory. In some examples, the machine-readable storage 508 may be electronic, magnetic, optical, or other physical storage device that stores executable instructions (e.g., code, logic). Thus, the machine-readable storage 508 medium may be, for example, RAM, an Electrically-Erasable Programmable Read-Only Memory (EEPROM), a storage drive such as a hard drive or solid state drive (SSD), an optical disc, and the like. The storage 508 may also include storage or memory external to the computing device 502. Moreover, as described herein, the machine-readable storage medium 508 may be encoded with executable instructions (e.g., executed by the processor 504) for detecting streaks using blocks and classifying detected streaks using extracted features. For example, the machine-readable storage medium 508 may be encoded with executable instructions for detecting streaks using blocks and classifying streaks using extracted features.

In some examples, a network interface 510 (e.g., a network interface card or NIC) may couple the computing device 502 to a network 512. For example, the network interface 510 may connect computing device 502 to a local network 512, a virtual private network (VPN), or the Internet. In some examples, the network interface 510 may include an Ethernet controller.

The computing device 502 may also include an electrophotographic printing mechanism 514. For example, the electrophotographic printing mechanism 514 may include a drum, a laser or LED, and toner.

The computer device 502 may include a scanner 516. In some examples, the scanner 516 can be an inline scanner. For example, the inline scanner may be installed at an output end of a printer to scan test images in real-time. In some examples, the scanner 516 can be a scanner of a multifunction printer (MFP).

The computing device 502 includes, an image preprocessor 518, a smooth area selector 520, a streak detector 522, a feature extractor 524, and a logistic regression classifier 526. The image preprocessor 518 descreens an image of a printed document. The image preprocessor 518 also separates the descreened image into blocks. The smooth area selector 520 selects a smooth area of the descreened image based on an averaging of localized color distance values of pixels in each of the blocks. For example, the smooth area selector 520 can calculate an average ΔE value for each block using the equation 6, as described with respect to FIG.

1. The smooth area selector 520 can then select a smooth area based on a received or calculated average ΔE value threshold. The streak detector 522 detects a streak in a block of the smooth area based on a color distance projection of the block. In various examples, the streak detector 522 can detect streaks in response to detecting that a projection threshold is exceeded. For example, the projection threshold can be calculated using Eq. 7. The feature extractor 524 extracts features from the detected streak. For example, the feature extractor 524 can extract a number of features including an area of the detected streak, a length to width ratio of the detected streak, a severity of the detected streak, a luminance channel difference, a sharpness of the detected streak, or any combination thereof. In some examples, the feature extractor 524 normalizes the number of features, and processes the normalized number of features via a trained logistic regression classifier to classify the detected streak. The logistic regression classifier 526 classifies the detected streak as a visible streak defect or an invisible streak defect based on the extracted features. In some examples, the logistic regression classifier 526 classifies a type of streak and a root cause of the detected streak. For example, the type of streak may be a developer streak, an ITB streak, an OPC streak, or a dirty scanner streak.

The image preprocessor 518, smooth area selector 520, the streak detector 522, the feature extractor 524, and the logistic regression classifier 526 may be instructions (e.g., code, logic, etc.) store in the machine-readable storage 508 and executed by the processor 504 or other processor to direct the computing device 502 to implement the aforementioned actions. An application-specific integrated circuit (ASIC) may also be employed. In other words, an ASIC may be customized for the aforementioned actions implemented via the image preprocessor 518, smooth area selector 520, the streak detector 522, the feature extractor 524, and the logistic regression classifier 526.

The block diagram of FIG. 5A is not intended to indicate that the computing device 502 is to include all of the components shown in FIG. 5A. Further, the computing device 502 may include any number of additional components not shown in FIG. 5A, depending on the details of the specific implementation. For example, the computing device 502 can include additional filters, etc.

Figure 5B:
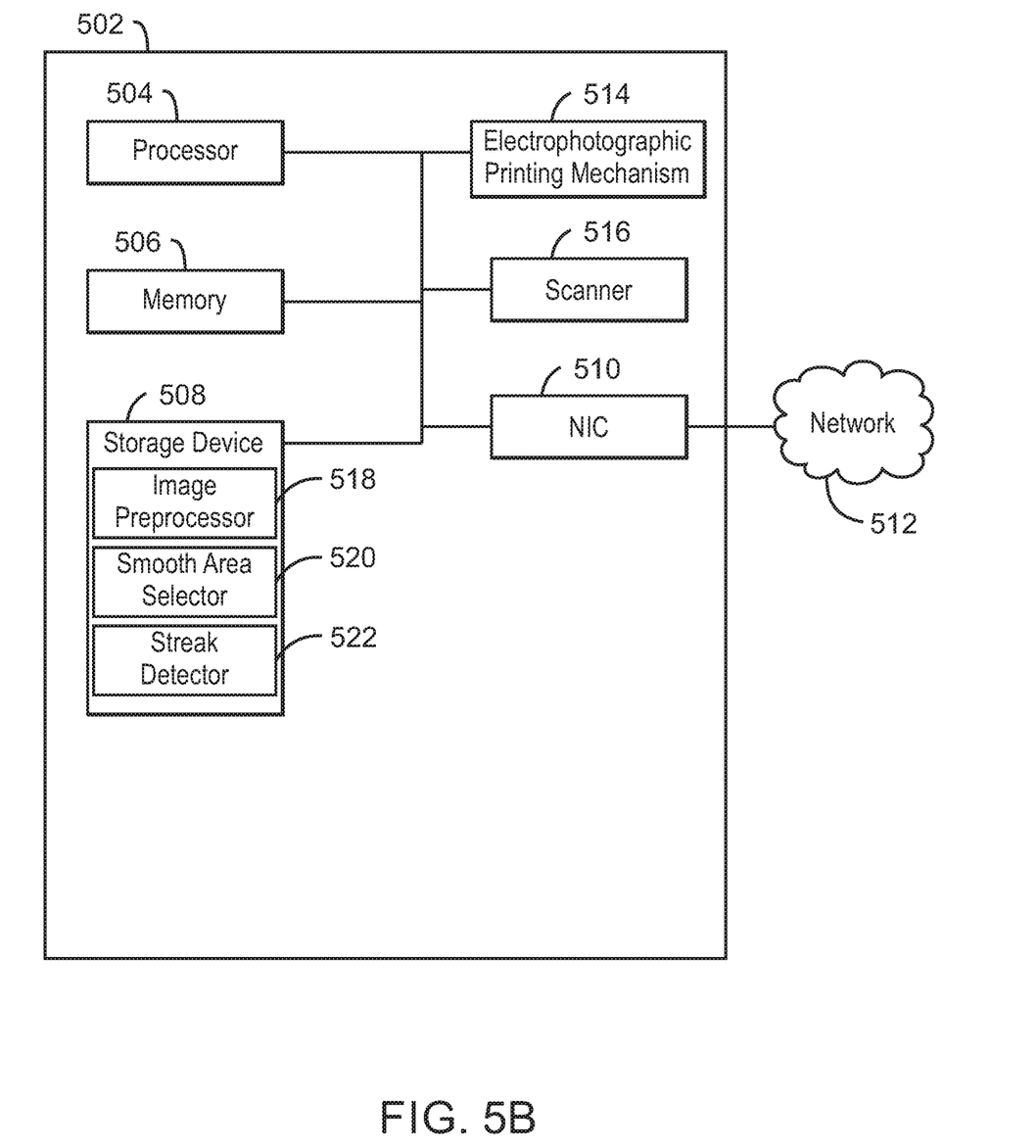
FIG. 5B is block diagram of another example computing device to detect streaks using blocks.

FIG. 5B is block diagram of another example computing device to detect streaks using blocks. The example computing device 502 of FIG. 5B includes similarly numbered elements as in FIG. 5A.

The block diagram of FIG. 5B is not intended to indicate that the computing device 502 is to include all of the components shown in FIG. 5B. Further, the computing device 502 may include any number of additional components not shown in FIG. 5B, depending on the details of the specific implementation. For example, the computing device 502 can include additional filters, etc.

Figure 6A:
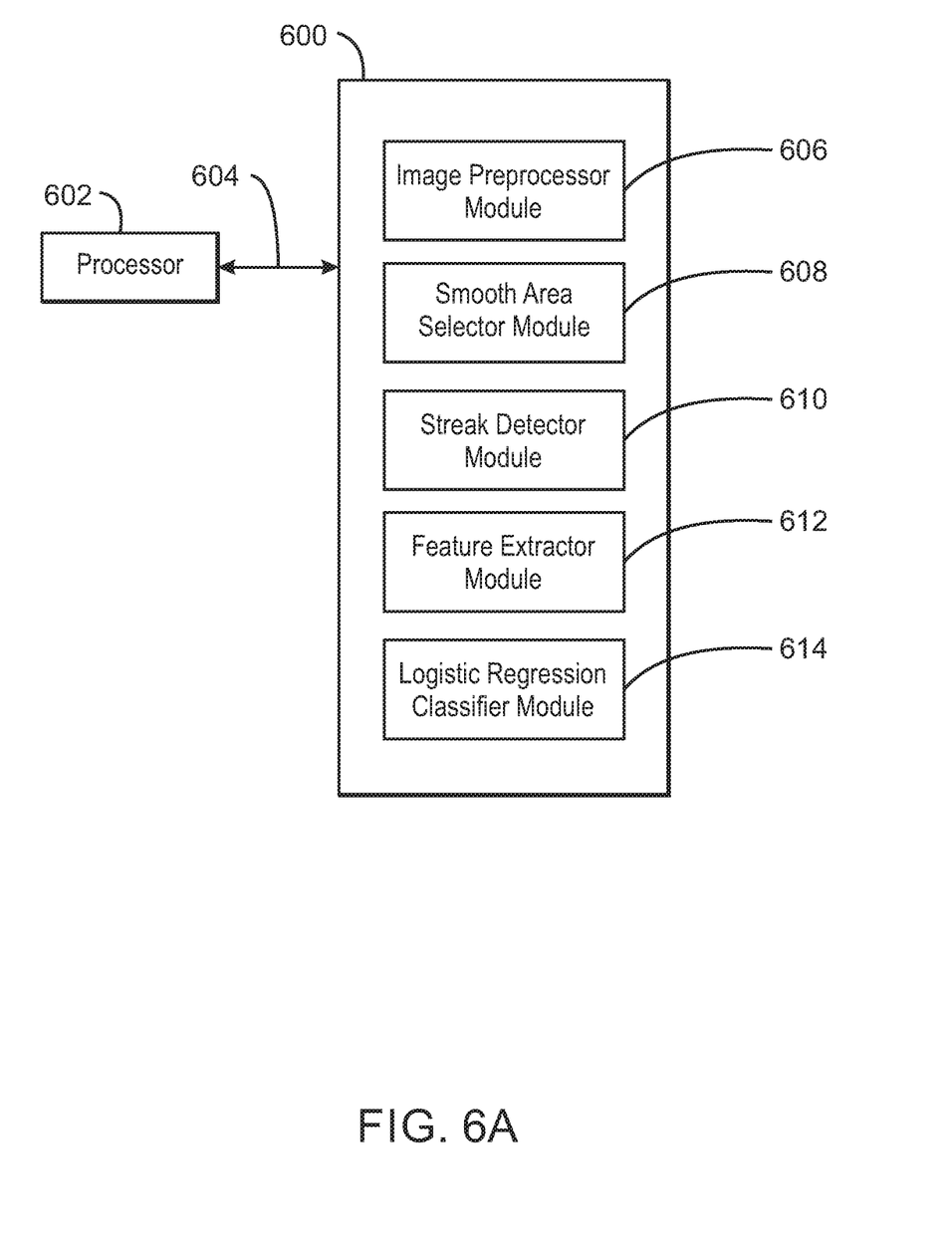
FIG. 6A is a drawing of an example machine-readable storage medium that can be used to detect streaks using blocks and classify detected streaks using extracted features.

FIG. 6A is a block diagram showing a tangible, non-transitory, machine-readable storage medium that stores code to direct a processor to detect streaks using blocks and classify detected streaks using extracted features. The machine-readable medium 600 can include RAM, a hard disk drive, an array of hard disk drives, an optical drive, an array of optical drives, a non-volatile memory, a flash drive, a digital versatile disk (DVD), or a compact disk (CD), among others. The machine-readable storage medium 600 may be accessed by a processor 602 over a bus 604. The processor 602 may be a processor of a computing device, such as the processor 504 of FIGS. 5A and 5B. In some examples, the processor 602 may be a field-programmable gate array (FPGA) processor and/or an ASIC processor. Furthermore, as indicated, the machine-readable medium 600 may include code configured to perform the methods and techniques described herein. Indeed, the various logic components discussed herein may be stored on the machine-readable medium 600. Portions 606, 608, 610, 612, and 614 of the machine-readable storage medium 600 can include image preprocessor code, smooth area detector code, streak detector code, feature extractor code, and logistic regression classifier code, respectively, which may be executable code (machine readable instructions) that direct a processor or controller in performing the techniques discussed with respect to the preceding figures.

Figure 6B:
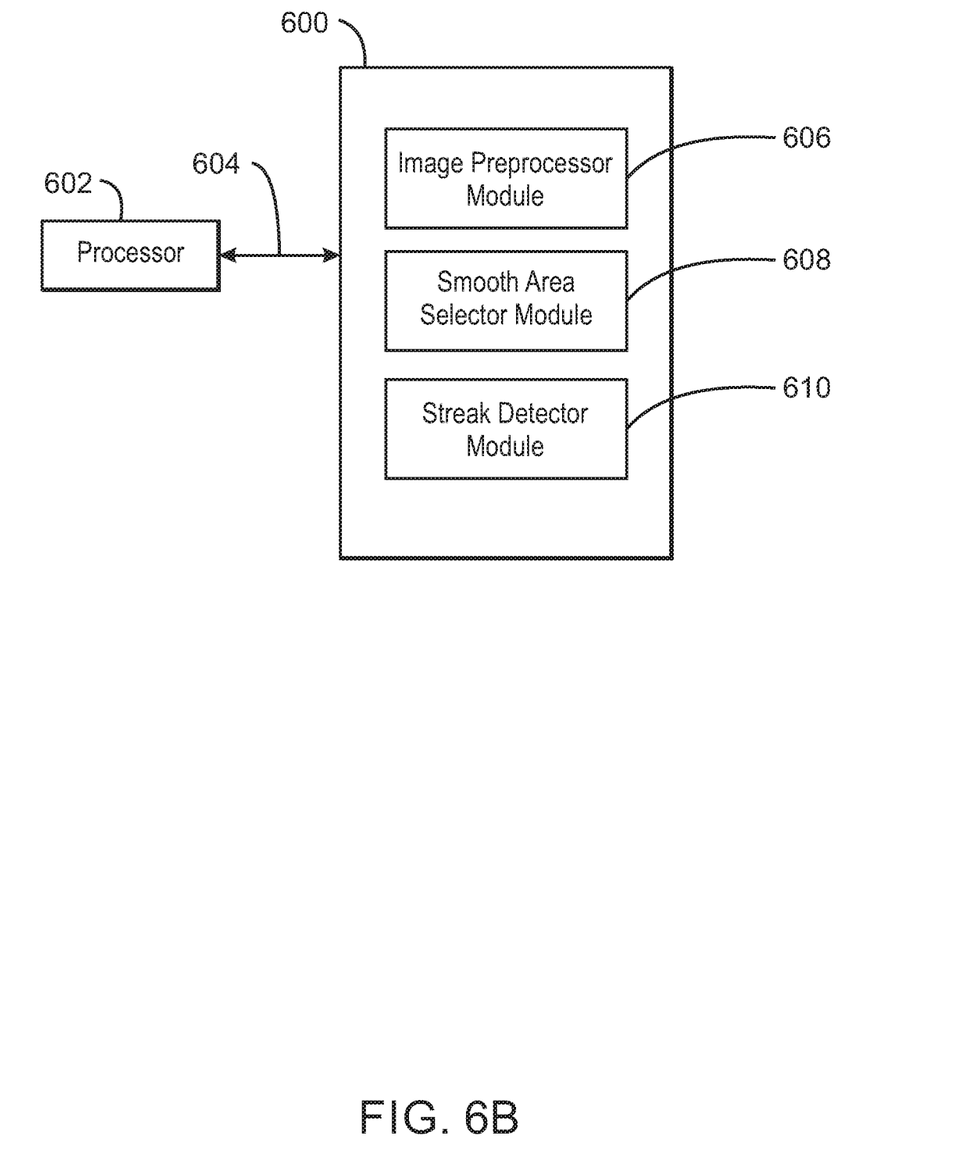
FIG. 6B is a drawing of another example machine-readable storage medium that can be used to detect streaks using blocks.

Indeed, the various logic (e.g., instructions, code) components discussed herein may be stored on the tangible, non-transitory machine-readable medium 600 as indicated in FIGS. 6A and 6B. For example, the machine-readable medium 600 may include the image preprocessor module 606 that, when executed by a processor, direct the processor or a computing device to descreen an image of a printed document. In some examples, the image preprocessor module 606 can also direct the processor or a computing device to separate the descreened image into blocks. The machine-readable medium 600 may also include a smooth area selector module 608 that when executed by a processor to direct the processor or a computing device to select a smooth area of the descreened image based on an averaging of localized color distance values of pixels in each of the blocks. For example, an average ΔE value for each block can be calculated using Eq. 6 as discussed in FIG. 1. The machine-readable medium 600 may further include the streak detector module 610 that, when executed by a processor, direct the processor or a computing device to detect a streak in a block of the smooth area in response to detecting that a magnitude of a color distance projection of the block exceeds a threshold value. The machine-readable medium 600 may also include feature extractor module 612 that, when executed by a processor, direct the processor or a computing device to extract features from the detected streak. For example, the extracted features may include an area of the detected streak, a length to width ratio of the detected streak, a severity of the detected streak, a luminance channel difference, a sharpness of the detected streak, or any combination thereof.

FIG. 6B is a drawing of another example machine-readable storage medium that can be used to detect streaks using blocks. The machine-readable medium 600 of FIG. 6B includes similarly numbered elements of FIG. 6A.

Although shown as contiguous blocks, the logic components may be stored in any order or configuration. For example, if the machine-readable medium 600 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
   descreening an image of a printed document;
   separating the descreened image into blocks;
   selecting a smooth area of the descreened image, wherein content of the printed document is excluded from the smooth area and the smooth area is based on an averaging of localized color distance values of pixels in each of the blocks;
performing a streak detection on the selected smooth area;
detecting a streak in a block of the smooth area in response to detecting that a magnitude of a color distance projection of the block exceeds a threshold value; and
determining a type of streak of the detected streak, wherein the type of streak is determined from a group of streak types associated with an electrophotographic printing process comprising:
a developer streak;
a faulty intermediate transfer belt (ITB) streak;
a faulty organic photo conductor (OPC) streak; and
a dirty scanner streak.

2. The method of claim 1, comprising processing the detected streak via a trained logistic regression classifier to classify the detected streak as a visible streak defect or an invisible streak defect.

3. The method of claim 2, comprising training the logistic regression classifier with a logistic loss function using feature vectors extracted from training images of various streaks with known causes.

4. The method of claim 2, comprising extracting features from the detected streak and processing the extracted features via the trained logistic regression classifier.

5. The method of claim 4, comprising detecting the type of streak and a root cause of the type of streak via the trained logistic regression classifier based on the extracted features.

6. The method of claim 1, wherein descreening the image comprises removing halftone patterns from the image using a Gaussian filter.

7. A system, comprising a processor to:
descreen an image of a printed document;
separate the descreened image into blocks;
select a smooth area of the descreened image, wherein content of the printed document is excluded from the smooth area and the smooth area is based on an averaging of localized color distance values of pixels in each of the blocks;
perform a streak detection on the selected smooth area;
detect a streak in a block of the smooth area based on a color distance projection of the block; and
determine a type of streak of the detected streak, wherein the type of streak is determined from a group of streak types associated with an electrophotographic printing process comprising:
a developer streak;
a faulty intermediate transfer belt (ITB) streak;
a faulty organic photo conductor (OPC) streak; and
a dirty scanner streak.

8. The system of claim 7, wherein the processor is to extract features from the detected streak and classify the detected streak as a visible streak defect or an invisible streak defect based on the extracted features.

9. The system of claim 7, wherein the processor is to extract features from the detected streak to classify the type of streak and a root cause of the detected streak.

10. The system of claim 7, wherein the processor is to extract a feature from the detected streak comprising an area of the detected streak.

11. The system of claim 7, wherein the processor is to extract a feature from the detected streak comprising a length to width ratio of the detected streak.

12. The system of claim 7, wherein the processor is to extract a feature from the detected streak comprising a severity of the detected streak.

13. The system of claim 7, wherein the processor is to extract a feature from the detected streak comprising a luminance channel difference.

14. The system of claim 7, wherein the processor is to extract a feature from the detected streak comprising a sharpness of the detected streak.

15. The system of claim 7, wherein the processor is to extract a plurality of features from the detected streak, normalize the plurality of features, and process the normalized plurality of features via a trained logistic regression classifier to classify the detected streak.

16. A non-transitory machine-readable storage medium encoded with instructions that, when executed by a processor, cause the processor to:
descreen a scanned image of a printed document;
separate the descreened image into predetermined sized blocks;
select a smooth area of the descreened image, wherein content of the printed document is excluded from the smooth area and the smooth area is based on an averaging of localized color distance values of pixels in each of the blocks;
perform a streak detection on the selected smooth area;
detect a streak in a block of the smooth area based on a color distance projection of the block exceeding a threshold value;
remove a noise detection from a streak detection result;
label pixels in the detected streak with consecutively generated internal ID numbers; and
determine a type of streak of the detected streak, wherein the type of streak is determined from a group of streak types associated with an electrophotographic printing process comprising:
a developer streak;
a faulty intermediate transfer belt (ITB) streak;
a faulty organic photo conductor (OPC) streak; and
a dirty scanner streak.

17. The non-transitory machine-readable storage medium of claim 16, wherein the blocks have a predetermined size of 200×200 pixels.

18. The non-transitory machine-readable storage medium of claim 16, wherein the noise detection is a vertical line of less than ⅓ of an inch.

19. The non-transitory machine-readable storage medium of claim 16, wherein the noise detection is a streak defect too small to be seen by a human eye.

20. The non-transitory machine-readable storage medium of claim 16, to further cause the processor to extract from the labeled pixels, features comprising:
a calculation of a width of the detected streak;
an angle of a maximum length of the detected streak;
an aspect ratio of height to width of the detected streak; and
an average color of the detected streak.

* * * * *